United States Patent Office 3,233,108
Patented Feb. 1, 1966

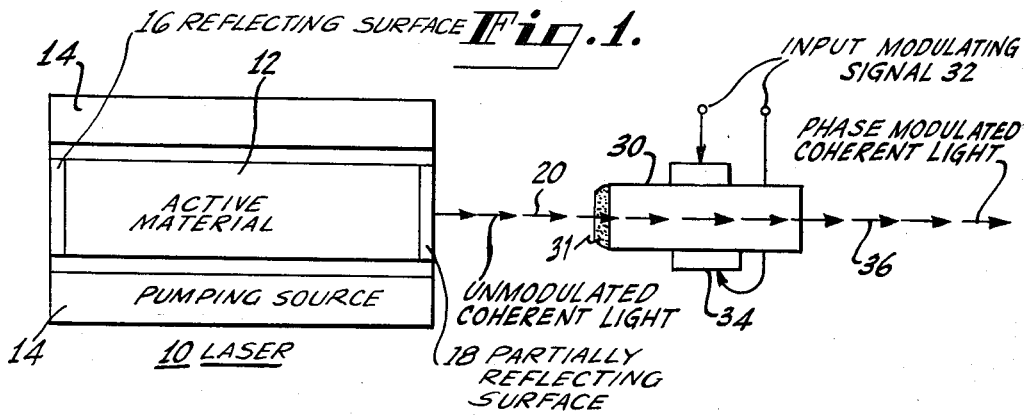
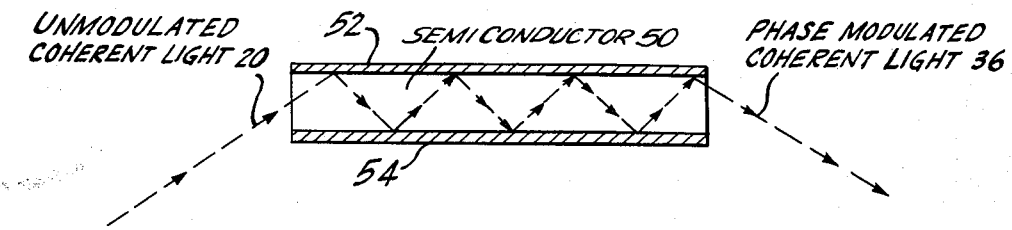
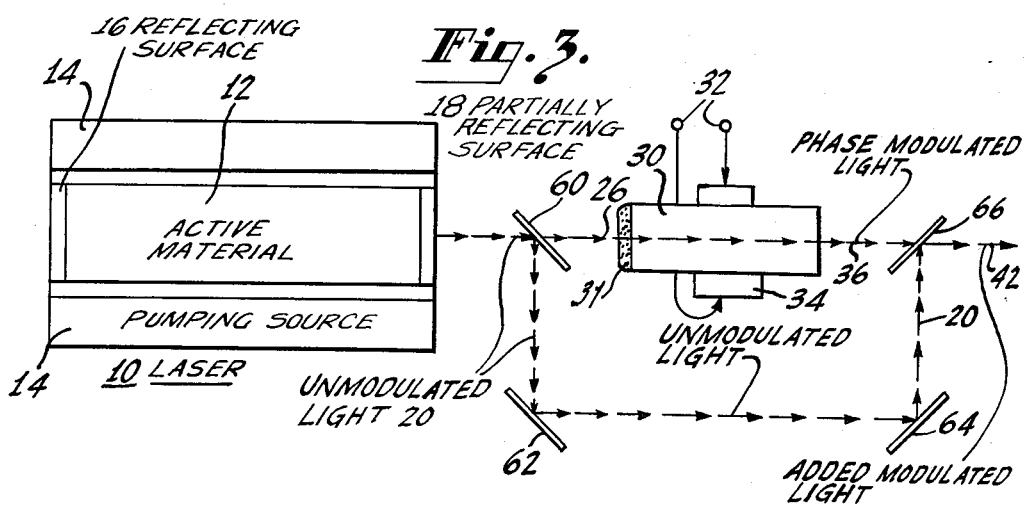

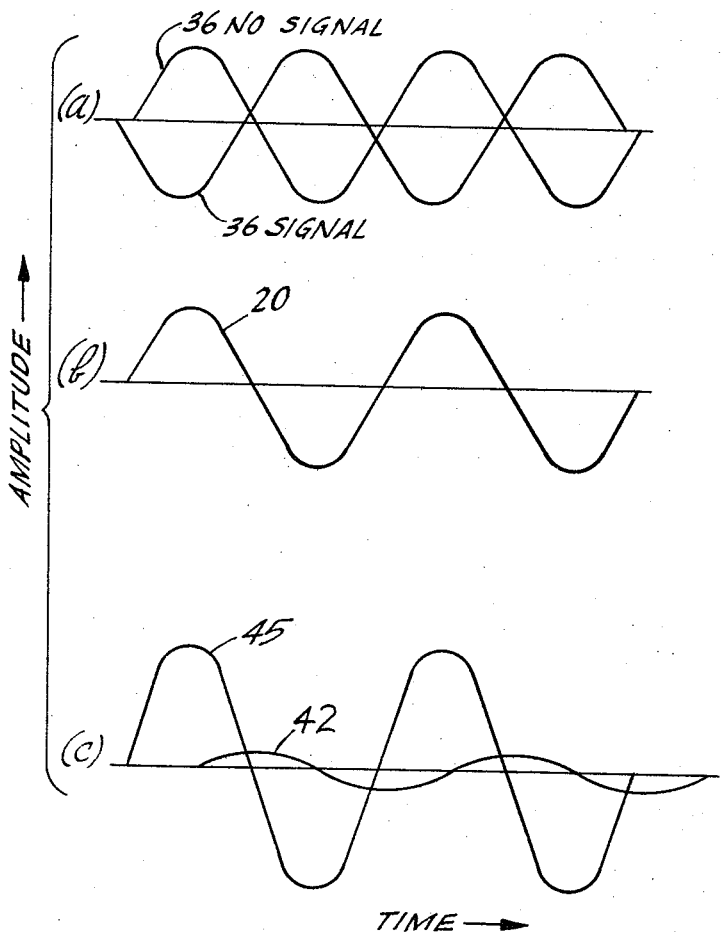

3,233,108
METHOD AND APPARATUS FOR PRODUCING PHASE MODULATION OF LIGHT WITH A SEMICONDUCTOR
Bruce Rosenblum, Princeton, N.J., assignor to Radio Corporation of America, a corporation of Delaware
Filed Oct. 30, 1962, Ser. No. 234,180
5 Claims. (Cl. 250—199)

This invention relates to improved optical maser or laser systems and methods. In particular, this invention relates to an improved method of and means for modulating the output light from a laser.

The term laser is a name used to refer to a device which provides "light amplification by stimulated emission of radiation." The laser device is most commonly used as a source of coherent light.

In general, a laser includes an active material that will produce the stimulated emission of radiation, an excitation source that pumps power into the active material, and a resonant structure or resonant cavity for oscillating the stimulated radiation.

The active lasing material is a material having at least two energy levels, and preferably three or four, separated in energy by an amount corresponding to a characteristic frequency. The active material is characterized by the properties that (1) the atomic particles may be excited into a higher of at least two energy levels and thus an inverted population condition may be produced, and (2) when the atomic particles return to the lower of the energy levels, the active lasing material emits light. The emitted light is such that, within the active lasing material, an incident photon triggers an ion to emit a photon in phase with the incident photon. Thus, substantially all of the emitted light is substantially in phase and is described as coherent light.

The excitation or pumping source is used to excite the ions into one of the higher energy levels. Known pumping sources are radio frequency fields, xenon flash tubes and other known types of energy sources.

The resonant structure, which is usually a part of the laser device, includes two light reflecting surfaces, such as mirrors, positioned at opposite ends of the active lasing material. One of the light reflective surfaces normally has a portion which is partially transparent so that output coherent light may be obtained from the laser. The light reflective surfaces are precisely oriented so that at least one resonant mode will exist between the mirrors at a frequency for which the spacing between mirrors is an integral number of half wavelengths.

A more detailed description of laser structures, operation and theory is described by Vogel et al. in Electronics, October 27, 1961, pages 40–47 and by Boyd et al. in Physical Review Letters 8, April 1, 1962, page 269–272.

When a laser is designed to communicate information, it is necessary to modulate the coherent light output by signal information. Thus, if the output light of a laser is modulated in phase, frequency or amplitude, information may be transmitted, as a modulated laser beam, from one location to another.

It is therefore an object of this invention to provide a novel laser transmitting system.

It is another object of this invention to provide a novel laser system having improved signal modulation means.

Another object is to provide improved methods of and means for modulating coherent radiation from a laser or the like.

These and other objects are accomplished in accordance with this invention by providing a laser transmitting device including a laser which produces a supply of coherent light. The coherent light beam from the laser is phase-modulated by passing the coherent light beam through a semiconducting device and by modulating the semiconductor device, by changing the refractive index thereof, e.g. as by modulating the charge carrier density of the semiconductor device, as the laser beam passes therethrough. By combining this phase-modulated laser beam, with an unmodulated laser beam, or a portion of the original unmodulated laser beam, an amplitude modulated signal may be provided, if desired.

The invention will be described in greater detail by reference to the accompanying drawings wherein:

FIG. 1 is a partially schematic view of a laser and modulator of a communication system of this invention;

FIG. 2 is a sectional view of a modification of the modulator of FIG. 1;

FIG. 3 is a partial schematic view of another embodiment of a laser communication system; and FIG. 4 is a graphical characteristic of the operation of the device shown in FIG. 3.

FIG. 1 shows a laser device 10 for producing coherent light radiation. The laser 10 generally comprises an active lasing material 12, a pumping source 14, and a pair of optical reflecting surfaces 16 and 18. The reflecting surfaces 16 and 18 form the opposite ends of a resonant cavity.

The active material 12 may comprise any known substance which has at least two, and preferably three or four, atomic states, or energy levels, separated by an amount corresponding to a characteristic transition emission frequency. As will be explained subsequently, the frequency output of the laser 10 should be less than a certain frequency.

The active material 12 has the property of being excitable into an inverted population density condition. In other words, the active material 12 is capable of having an excess population provided in one of the upper energy levels as compared to a lower energy level. The active material 12 emits coherent light as the atomic particles return from the upper energy level to a lower energy level. The active material 12 may comprise a solid, or a gas. The choice of an active lasing material will depend, in part, upon the material selected as the semiconducting modulating device. Specific examples of active lasing materials will be given subsequently.

The active lasing material 12 is positioned in a resonant cavity formed by light reflecting surfaces 16 and 18. The light reflecting surfaces 16 and 18 are precisely oriented so that one or more resonant modes will exist between the light reflecting surfaces at frequencies for which the spacing therebetween is an integral number of half wavelengths. At least a portion of one of the light reflecting surfaces 18 is partially transparent so that a light output beam 20 may be obtained from the laser device 10. The light reflecting surfaces 16 and 18 may comprise any known light reflecting surfaces such as highly reflective silver mirrors, or interference type reflecting surfaces such as the Fabry-Perot structure.

The pumping source 14 may comprise any source of energy which is capable of exciting the atomic particles in the active lasing material 12 from a lower energy level into one of the higher energy levels. In other words, the pumping source 14 is a source of energy for establishing the inverted population density condition in the active lasing material 12. Examples of such pumping sources are a radio frequency field, a xenon flash tube or other known types of energy sources.

During operation, the laser device described produces an unmodulated beam 20 of coherent light. In order to modulate the coherent light beam 20, the unmodulated beam 20 is directed through a semiconducting modulator device 30. The device 30 is made of a material which is substantially transparent to light of the wavelength produced by the laser. The critical wavelength above which the semiconducting device 30 is transparent depends upon the material selected as the semiconductor 30. An an example, a germanium crystal is transparent to light having a wavelength greater than about 1.8 microns. In other words, the material used for the device 30 is selected to have a band gap that is greater than the photon energy of the light beam 20. Therefore, the semiconductive device 30 is substantially transparent to the coherent light beam 20. A ¼ wavelength of material 31 having an index of refraction matching that of air to the device 30 may be used.

The semiconductor material 30 is used to modulate the phase of the coherent light beam 20. Three parameters of the semiconductive device 30 may be varied to modulate the phase of the coherent light beam 20 as it passes through the semiconductive device 30. These three parameters are the charge carrier mass, the relaxation or scattering time of the carriers, and the carrier density within the semiconductor body. The carrier density modulation is the preferred parameter since it is most readily adjustable by presently known means. Thus, the phase modulation of the coherent light beam is accomplished by modulating the free carrier density in the body of the semiconductive device 30. Either type of carrier, or both, may be modulated and generally, depending upon the material, the electron carriers will produce the greater effect. Any method of modulating the carrier density within the semiconductive device 30 may be used. The method illustrated is that of applying a modulating signal, from any conventional source between an injection electrode 32 and a base connection 34. Any known means for, or method of, modulating the carrier density, other than the injection means shown, may be utilized.

The phase of the coherent light beam 20 is modulated because of the modulation of the carrier density in the semiconductive device 30. The reason for this is that, the index of refraction of the semiconductive device 30 depends, in part, upon the free carrier density existing within the semiconductive device 30. Since the index of refraction of the semiconductive device is modulated by modulating the carrier density, the phase of the light 36 leaving the semiconductor 30 is also modulated by modulating the carrier concentration. As the carrier density of the semiconductor is increased, the phase of the coherent light beam 20 is changed.

The semiconductive body 30 may be made of any desired material as long as the band gap of the semiconductor is greater than the photon energy.

Thus, as was previously stated, the semiconductor material is selected to be transparent to the wavelength of light produced by the active lasing material 12. Examples of suitable active lasing materials 12, and semiconducting bodies 30 that are transparent to the principal wavelengths produced by the corresponding lasing materials are as follows:

| Lasing Materials 12 | Wavelength Produced, μ | Semiconducing Body | Minimum Wavelength Passed, μ |
|---|---|---|---|
| U³⁺ in CaF₂ | 2.61 | Ge | 1.8 |
|  |  | Se | 1.1 |
| Nd³⁺ in glass | 1.06 | GaAs | .9 |
| Cesium (gas) | 7 | InSb | 6 |

During operation of the laser transmitting system shown in FIG. 1, it may be desirable to decrease the thermal scattering of the carriers in the semiconducting body 30 by operating the semiconductive body 30 under controlled temperature conditions, such as for example by cooling to approximately 77° K. with liquid nitrogen. The cooling may be done by any known system, not shown.

It should be understood that the modulation provided by the semiconductive body 30 is phase modulated. It has been known heretofore to modulate ordinary infrared light by absorption. The absorption has also been controlled by the injection of charge carriers in a germanium body. Thus, in the prior art, the amount of light output is controlled solely by absorbing the light passing therethrough. It should also be clearly understood that phase modulation as taught herein provides a much greater effect than the known absorption effect, for optical frequencies and usual carrier scattering times, than the known absorption effect. Some no light is absorbed by the body 30, there is more light available for transmission. Thus efficient use of the laser light is provided.

As an example, assume that a semiconductor body of germanium two cm. long and one mm. by one mm. in cross section is to be used to modulate the coherent light beam 20. Also assume that seventy watts of power may be dissipated without adversely raising the temperature of the germanium. Further assume that the laser frequency is $1.6 \times 10^{14}$ c.p.s., the modulating frequency is $10^9$ c.p.s., and the system is operating at room temperature. Under these conditions, a phase change of approximately 180° will be produced using the phase modulation induced by signals at terminal 32 while the absorption modulation of the prior art will produce a modulation of less than one percent. As will be explained in connection with FIG. 3, this phase modulation of 180° may be easily converted into an amplitude modulation of one hundred percent.

The reason that the phase modulation is so much greater is that, when considering optical frequencies and usual carrier scattering times, the carriers move in the semiconductor approximately 90° out of phase with respect to the electric field of the coherent light beam. Therefore, the carriers absorb substantially no light at these frequencies. In other words, at optical frequencies, the carriers are primarily reactive, rather than resistive, and therefore have substantial influence on the phase of the coherent light beam but very much lower absorption properties.

The rate at which either phase modulation or absorption modulation can be accomplished by a semiconductor body is limited by the rate of energy dissipation which can be tolerated in the system. Since an equivalent modulation percentage can be obtained with substantially fewer carriers by the phase modulation technique, substantially higher modulation frequencies can be used. The higher the modulation frequency, the more information that can be transmitted by one beam.

The phase modulated beam 36 is transmitted and may then be received by several means. For example, the phase modulated beam may be combined at the receiver with a local oscillator lasing beam and then detected.

FIG. 2 shows an embodiment of this invention wherein the unmodulated laser beam 20 is modulated by a semiconductive device 50. This embodiment differs from that shown in FIG. 1 in that a very long semiconductive device 50 is utilized and the light is retained in the semiconductive device 50 for a longer period of time by multiple reflections, as shown. In such a case, it may be desirable to propagate the modulating signal so that it travels substantially parallel to the electrodes 52 and 54, and at substantially the same velocity, as the coherent light beam 20 travels in this direction. For example, the electrodes 52 and 54 may thus comprise the upper and lower plates of a parallel plate waveguide with the electric field of the waveguide producing the carriers. This embodiment requires less power than the embodiment shown in FIG. 1 since the light is in the semiconductor body for a longer period of time. Therefore, a still smaller change in density of free carriers is required to shift the phase of the light by a predetermined amount.

The multiple reflections may be produced, for example, by using continuous electrodes 52 and 54, which are light reflecting to the laser generated wavelengths. A suitable material for the electrodes 52 and 54 may be a layer of metal such as, for example, aluminum.

FIG. 3 shows an embodiment of this invention wherein a phase-modulated coherent light beam 36 is combined with an unmodulated coherent light beam 20 to produce an amplitude modulated coherent light beam 42. The combining of the phase modulated and unmodulated light beams may be done at the transmitter, as shown in FIG. 3, or, in the alternative, both light beams may be sent to a remotely positioned receiver where they are combined.

In this embodiment, a portion of the coherent light beam 20 from the laser 10 is divided out by an optical means such as, for example, a first partially silvered mirror 60. This divided portion is directed to a completely silvered mirror 62, to a second completely silvered mirror 64 to be recombined with the phase modulated light 36 by means of a second partially silvered mirror 66. The coherent light beam 36 is phase modulated by means of a semiconductive device body 30, or by the use of multiple reflections as described in connection with the semiconductive device 50 of FIG. 2. In the embodiment of FIG. 3, the partially and the totally reflecting mirrors, may be replaced by other known optical systems such as lenses.

As illustrated in FIG. 4 by combining the phase modulated coherent light beam 36 with the unmodulated coherent light beam 20, there is produced an amplitude modulated coherent light beam 42. Curve 45 is the output waveform under a no signal condition. For maximum efficiency, the path length of the unmodulated portion 20 of the beam is selected so that the unmodulated beam 20 is 90° out of phase, with respect to the phase modulated coherent light beam 36, under the no signal condition, when recombined with the phase modulated beam 36.

Thus, the light output from a laser device can be efficiently modulated, at a high rate of speed, by modulating the phase of the coherent light beam as it passes through a semiconductive device. When desired, this phase modulation may be converted into amplitude modulation by adding the phase modulated coherent light beam to an unmodulated coherent light beam.

What is claimed is:

1. The method of modulating a coherent light beam comprising the steps of passing a portion of said coherent light beam through a semiconductive device, which semiconductive device is substantially transparent to said coherent light, modulating the number of carriers in said semiconductive device whereby the phase of said portion of said coherent light beam is modulated, and combining said phase modulated portion of said coherent light beam with another portion of said coherent light beam whereby an amplitude modulated light beam is produced.

2. A laser communication system comprising a laser for producing a beam of coherent light, means positioned in the path of said beam of coherent light for dividing said beam of coherent light into at least two portions, a semiconductive means positioned in the path of at least one of said two portions, said semiconductive device being substantially transparent to said coherent light, means for modulating the carriers in said semiconductive means whereby the phase of said portion of said beam of coherent light passing through said semiconductive means is modulated, and means for combining the phase modulated portion of said beam of coherent light with an unmodulated portion of said beam of coherent light whereby an amplitude modulated beam of coherent light is provided.

3. A laser communication apparatus comprising a laser for producing a beam of coherent light, means for modulating the phase of said beam of coherent light, said means comprising a semiconductive body positioned in the path of said beam of coherent light, said semiconductive body being substantially transparent to said coherent light, and means for modulating the index of refraction of said semiconductive body in response to a signal, and means for combining said phase modulated beam of coherent light with an unmodulated beam of coherent light for producing an amplitude modulated beam of coherent light.

4. A method of modulating a coherent light beam comprising passing a portion of coherent light beam through a semiconductive device, said semiconductive device being substantially transparent to said light beam, modulating the index of refraction of said semiconductive device whereby the phase of said portion of said coherent light beam is modulated, and combining said portion of said coherent light beam with an unmodulated portion of said coherent light beam whereby an amplitude modulated coherent light beam is produced.

5. A modulator for modulating a coherent light beam comprising a semiconductive body positioned in the path of a portion of said coherent light beam, said semiconductive body being substantially transparent to said beam of light, means for modulating the index of refraction of said semiconductive body whereby the phase of said portion of said coherent light beam is modulated, and means for combining the phase modulated portion with an unmodulated portion of said coherent light beam, whereby an amplitude modulated coherent light beam is produced.

References Cited by the Examiner

UNITED STATES PATENTS

| 1,954,947 | 4/1934 | Pajes | 88—61 |
| 2,385,086 | 9/1945 | D'Agostino et al. | 250—199 |
| 2,692,950 | 10/1954 | Wallace | 250—199 |
| 2,692,952 | 10/1954 | Briggs | 250—199 |
| 2,788,710 | 4/1957 | West | 88—61 |
| 2,929,922 | 3/1960 | Schawlow et al. | 250—199 |
| 3,102,959 | 9/1963 | Diemer | 250—199 |

OTHER REFERENCES

Gibson: "Germanium Modulator . . .," Electronics, October 1954, pp. 155–157.

Winogradoff article, IBM Tech. Disclosure Bulletin, vol. 3, No. 10, March 1961, pp. 84 and 85.

Kamal et al.: Proc. I.R.E., vol. 49, No. 8, August 1961, p. 1331.

Pugh: IBM Tech. Disclosure Bulletin, vol. 4, No. 8, January 1962, p. 57.

DAVID G. REDINBAUGH, *Primary Examiner.*